United States Patent [19]

Martin

[11] 4,431,050
[45] Feb. 14, 1984

[54] STACKED-PLATE HEAT EXCHANGER MADE OF IDENTICAL CORRUGATED PLATES

[75] Inventor: John J. Martin, Milford, Conn.

[73] Assignee: Avco Corporation, Stratford, Conn.

[21] Appl. No.: 312,309

[22] Filed: Oct. 16, 1981

[51] Int. Cl.³ .......................... F28F 3/04; F28D 9/02
[52] U.S. Cl. .................................................... 165/166
[58] Field of Search ................................ 165/166, 167

[56] References Cited

U.S. PATENT DOCUMENTS

| | | | |
|---|---|---|---|
| 2,865,613 | 12/1958 | Egenwall et al. | 165/167 |
| 3,424,240 | 1/1969 | Stein et al. | 165/166 |
| 3,785,435 | 1/1974 | Stein et al. | 165/166 X |
| 3,831,674 | 8/1974 | Stein et al. | 165/166 |
| 4,374,542 | 2/1983 | Bradley | 165/166 |

FOREIGN PATENT DOCUMENTS 3008717 9/1981 Fed. Rep. of Germany ...... 165/166

OTHER PUBLICATIONS

Compactness of Ground Turbine Depends on Integral Recuperator, Engel et al., Automotive Engineering, Aug. 1971, pp. 13–17, vol. 79, No. 8.

*Primary Examiner*—Sheldon J. Richter
*Attorney, Agent, or Firm*—Ralph D. Gelling

[57] ABSTRACT

Plates of identical configuration are formed of relatively thin material and are assembled in stacked construction pairs, with alternating patterns of different corrugations being provided between spaced openings in each plate. Alternate plates in each stack provide corrugation patterns with transverse relationship assuring turbulence-inciting structure in both primary and secondary flow passages. Pairs of plates are formed by assembling the identical plates in back-to-back relationship to form a construction pair, with the pairs of plates being secured together by sealing only two surfaces of substantially uniform thickness of plate. The construction of the stack of plates is accomplished without necessity for provision of tubular inlet and outlet channels extending through the stack structure. The plates, being of identical configuration and construction, reduce the number of hydroform punch and dies required, facilitate continuous flow production, minimize tooling die upkeep, and minimize production halts due to die temperature-dimension changes.

3 Claims, 4 Drawing Figures

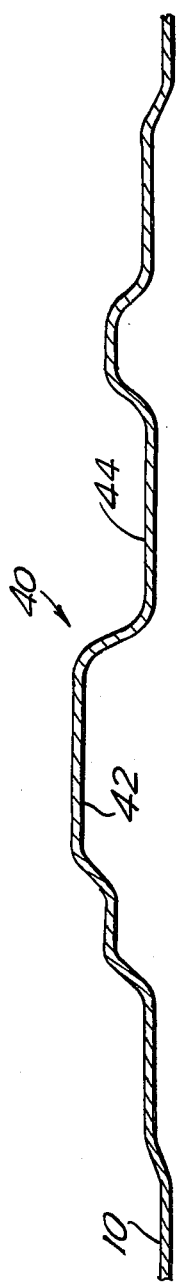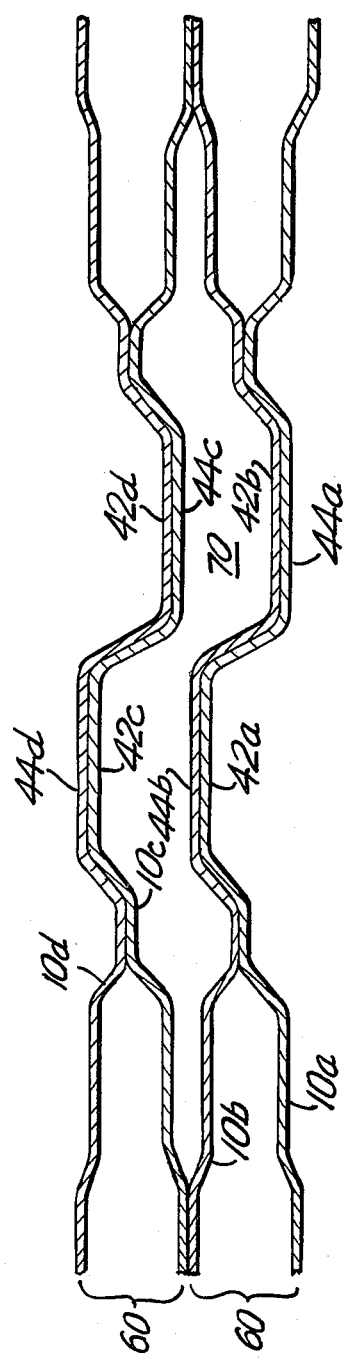

STACKED-PLATE HEAT EXCHANGER MADE OF IDENTICAL CORRUGATED PLATES

BACKGROUND OF THE INVENTION

The Government has rights in this invention pursuant to Contract No. DAAK30-78-C-0054 awarded by the Department of the Army.

The subject invention relates to a new and improved corrugated plate-type heat exchanger, and more particularly a heat exchanger device made up of a plurality of identical plates of relatively thin material, so formed and stacked as to provide heat transfer through said plates to and from a series of alternate primary and secondary flow passages formed between the stacked, alternate plates.

U.S. Pat. No. 3,424,240 which issued to Wolfgang J. Stein et al on Jan. 28, 1969, entitled "Corrugated Stacked-Plate Heat Exchanger", and which is assigned to the assignee of the subject application, discloses a heat exchanger device made up of a plurality of plates formed in "series one" and "series two" type configurations for stacking alternatively in construction pairs to form the stack. The respective plates of the series one and the series two types have spaced openings therein which are aligned, when stacked, to form inlets and outlets to and from one of the series of longitudinal flow passages in the stacked plates. The "series one" plates are preferably formed with a pattern of corrugations between the spaced openings extending across the plates and thus provide complementing channel-forming, generally parallel wave formations on both surfaces of the series one plates. On the other hand, the series two plates are formed with a pattern of generally parallel corrugations forming a pattern between the spaced openings on both sides of the plates, with the pattern formed by the corrugations on the series two plates extending transversely to the corrugations in the series one plates on both sides of said plate when a series one plate and a series two plate are positioned together to form a construction pair with the spaced opening in alignment. The series one and series two plates are sealed together by welding or brazing.

In the production of the series one and series two plates for forming the heat exchanger of the type disclosed in U.S. Pat. No. 3,424,240, it is necessary that two different sets of dies be utilized for forming the different series one and series two plates. An example of an apparatus which may be employed for forming a stacked plate is disclosed in applicant's prior U.S. Pat. No. 3,672,194 entitled "Forming and Trimming Apparatus for Hydroform Press", which patent is assigned to the assignee of the subject application. The configuration of the series one and series two plates employed in the heat exchanger of U.S. Pat. No. 3,424,240 requires fabrication of two sets of dies, and also requires that the identical number of series one and series two plates be available when a stacked-plate heat exchanger is being assembled. Heretofore, it has been found that because of set-up time required for hydroforming machines, as well as the shifts that operators of such machines work, invariably a greater number of either a series one or series two plates are produced over a period of time such that on certain occasions a deficiency in the availability of either the series one and series two plates is experienced, thereby giving rise to production problems. In addition, in order to insure that an operative tooling die is available for manufacture of both the series one and series two plates, it is usual to have at least two dies available to manufacture either the series one or the series two plates. Hence, the initial cost of providing tooling for manufacturing a corrugated stacked-plate heat exchanger according to U.S. Pat. No. 3,424,240 is expensive.

Accordingly, it is an object of the subject invention to provide a new and improved corrugated stacked-plate heat exchanger which employs plates that are identical in configuration and size.

It is a further object of the subject invention to provide a stacked-plate heat exchanger which employs identical plates thereby minimizing tooling die fabrication and tooling upkeep, as well as minimizing production problems.

SUMMARY OF THE INVENTION

The above and further objects and advantages of the subject invention are achieved by the provision of a corrugated stacked-plate heat exchanger which employs plates which are of identical configuration, and more particularly each plate is configured so as to include about the radially outer portion thereof, an alternative arrangement of radially extending and transversely extending parallel corrugations. Furthermore, each identical plate includes an array of alignment embossment so as to facilitate initial alignment and assembly of the plates during the fabrication operation. The aforesaid plate structure is a stacked-plate construction to be assembled together, with the joints of said assembly accomplished by welding or brazing of two identical plate surfaces contacting each other, and with the plate surfaces formed from two identical plates of uniform thickness thereby limiting the internal stresses in the structure resulting from growth of the metal plates during a wide range of temperature variations. The resulting corrugated stacked-plate heat exchanger obviates the necessity for tubular inlet and outlet channels extending longitudinally of the stack and, furthermore, obviates the necessity for the provision in the stack of connections and inlet and outlet openings from such tubes to and from the heat transfer channels in the stack. Furthermore, the provision of identical plates employed in the corrugated stacked-plate heat exchanger of the subject invention facilitates production of the heat exchanger since only a single hydroform punch is required, and die upkeep is thus minimized. Furthermore, continuous production of the identical plates made according to the invention is available since the die does not have to be changed, as was required to manufacture the series one and series two plates in the prior art heat exchanger.

Further objects and advantages of the subject invention will become apparent from the following detailed description when taken in conjunction with the drawings.

BRIEF DESCRIPTION OF THE DRAWINGS

FIG. 3 is a cross sectional view taken along line 3—3 in FIG. 1 and illustrating an alignment embossment provided in the new and improved heat exchanger plate of the subject invention; and FIG. 4 is a cross sectional view through the alignment embossment of a plurality of contiguous plates in a heat exchanger stack made according to the subject invention.

DESCRIPTION OF THE PREFERRED EMBODIMENT

Figure 1:
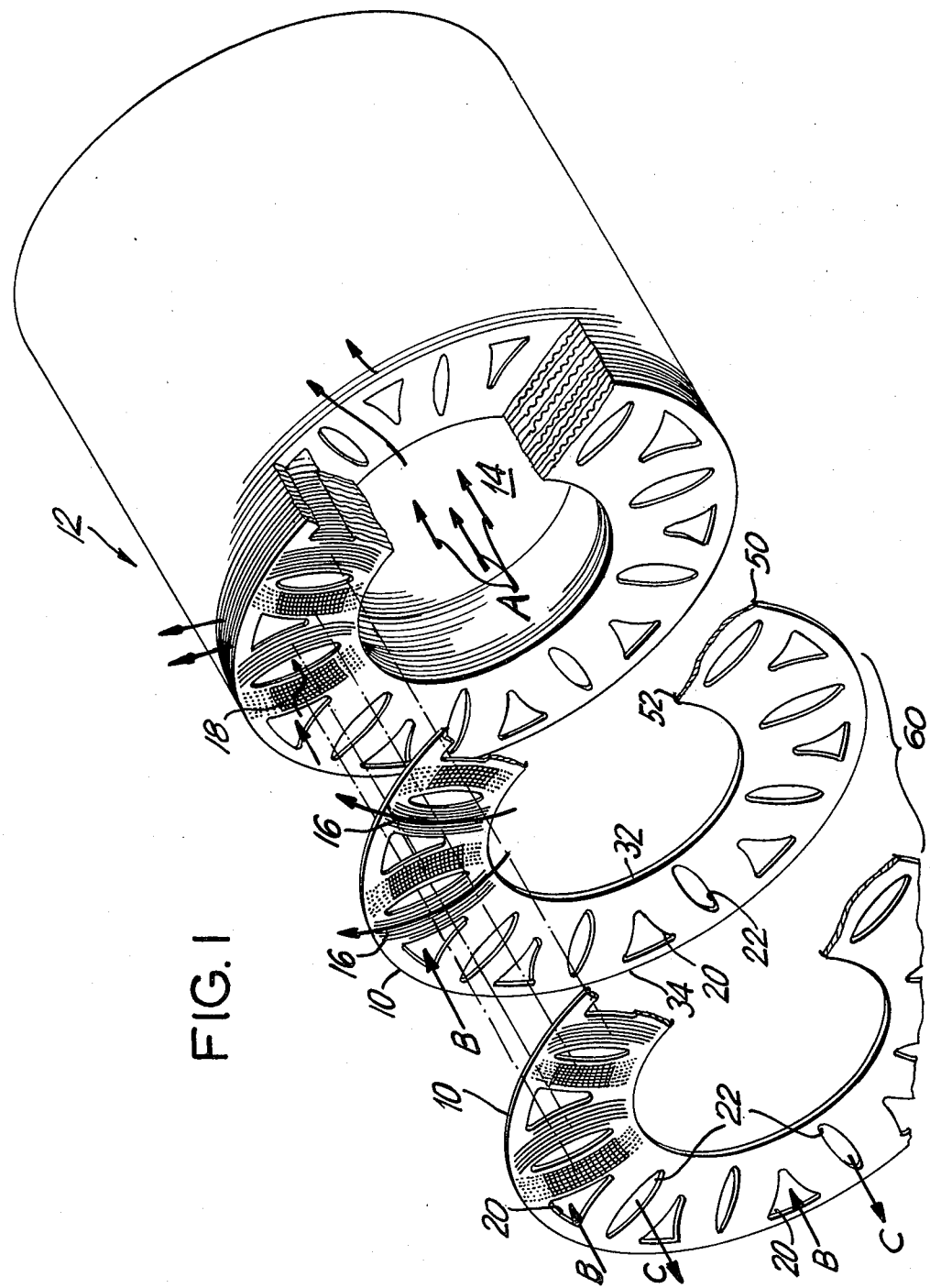
FIG. 1 is an exploded, perspective view of a plate-type heat exchanger device made up of a plurality of identical stacked plates which are annular in form and provide for heat transfer from a high-temperature fluid flow, which might flow inward or outward through the stack, but here shown as an exhaust gas from the center annular region, flowing outward through alternate plates of the stack, and transferring heat through the plates to secondary fluid flow between alternate plates in the stack.

Turning to FIG. 1, a multiplicity of thin, metallic plates 10 make up a stack 12 forming an annular heat exchange unit which is particularly adapted for use as a regenerator for a gas turbine engine. A primary fluid-flow passage 14 extends centrally of the annular stack 12 and is adapted to accommodate the hot exhaust gases, designed by the arrows A from a gas turbine power plant. The arrows A show the flow of hot exhaust gases from the central flow passage 14 continuing radially outward between alternate plates 10 of the stack 12 to the outside of the stack in primary flow passages 16. By this arrangement, heat transfer is accomplished from the primary fluid-flow passages through the one thickness of plates 10 into adjacent alternate secondary fluid-flow passages 18. The latter are adapted to accommodate the air flow from the compressor of the gas turbine engine entering the stack 12 through inlet opening 20 and passing through the secondary fluid-flow passage 18 to alternate outlets 22. The multiplicity of secondary fluid-flow passages 18 alternate with primary fluid-flow passages 16 between alternate plates 10, and thus effect the heat transfer through the single plate thickness. In the diagrammatic illustration of FIG. 1, the arrows B represent flow into the spaced inlet openings 20, while the arrows C indicate outlet flow through the alternate outlet openings 22 in each plate 10. As illustrated, the inlet 20 and outlet 22 openings through the plate alternate circumferentially around each annular plate and are aligned in the stack 12. Furthermore, the inlet openings 20 are generally triangular in configuration, while the outlet openings 22 are generally oblong in configuration.

Figure 2:
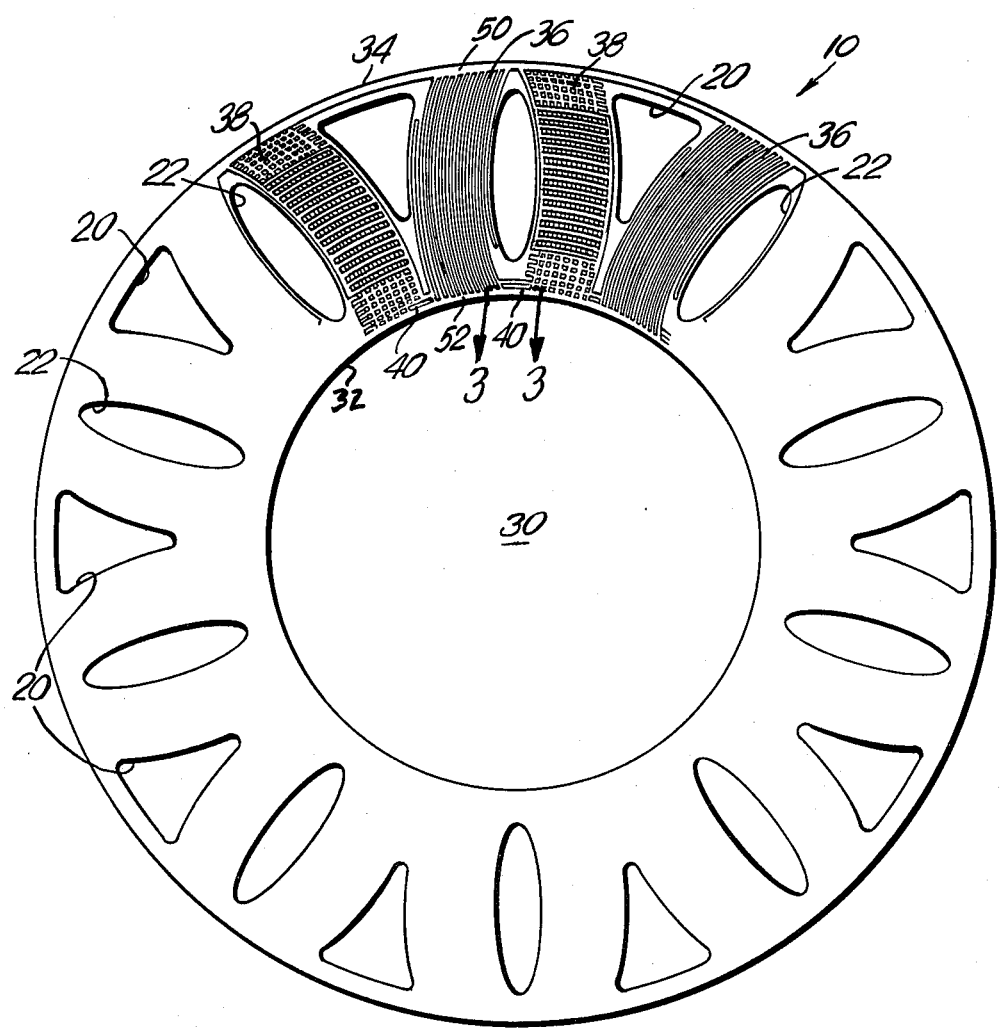
FIG. 2 is an end view of the new and improved stacked-plate heat exchange plate employed in the corrugated stack-plate heat exchanger of the subject invention.

Each of the plates 10 is of identical configuration and size. More particularly, as illustrated in FIG. 2 each plate 10 is of annular configuration including a central annular opening 30 defining an inner edge 32, and a peripheral outer edge 34. The inlet openings 20 of generally triangular configuration and the outlet openings 22 of generally oblong configuration are alternately arranged in an array about the circumference of the plate 10 intermediate the inner edge 32 and the outer edge 34. The spaces between said inlet 20 and outlet 22 openings are arranged in an alternate pattern of corrugations 36 and corrugations 38. Corrugations 36 are in an arcuate pattern extending in a generally radial direction from the inner edge 32 to the outer edge 34 and provide complementing channel-forming wave formations from adjacent the inner edge 32 to adjacent the outer edge 34 on the surface of the plate 10. As noted above, the radially extending corrugations 36 are repeated alternatively between the inlet 20 and outlet 22 openings circumferentially around the annular plate 10, and are effective to define the primary flow passages 16 in the stack 12.

Corrugation pattern 38 extends in a generally circumferential direction between alternate inlet 20 and outlet 22 openings so as to provide connection between said spaced openings. In a preferred embodiment, as shown in FIG. 2, the corrugation pattern 38 may be in the form of a waffle arrangement whereby both circumferential and radial passageways interconnecting the adjacent inlet 20 and outlet 22 openings are defined. The corrugation pattern is effective to define the secondary flow passages 18 in the stack 12. As an alternative, the pattern 38 may comprise a generally arcuate array of corrugations extending circumferentially of the plate 10 so as to define complementing channel-forming wave formations between the inlet 20 and outlet 22 openings.

As also illustrated in FIG. 2, disposed adjacent the inner edge 32 of the annular plate 10 is an array of alignment embossments of the configuration as more particularly illustrated in FIG. 3. As shown, each alignment embossment 40 includes an embossment portion 42 and a debossment portion 44 which are of complementary cross section and are disposed in contiguous relationship. The alignment embossments 40 aid in assembly and alignment of the plates 10 into the stack 12 as more fully described hereinafter.

Further formations are provided on each plate 10 affording displaced formations of circumferential planar surfaces 50 outside and 52 inside on each of the edges of the plate 10. By this arrangement, the circumferential edge surfaces 50 and 52 of two contiguous plates 10 will make surface contact to form a pair 60 of plates in the stack and such contacting edge surfaces may be sealed as by welding or brazing to complete a stack 12 of such pairs 60 secured together. In the formation of each pair 60 of plates, one plate 10 is turned through 180° about a diametrical axis in the plane of the plate whereby respective patterns 36 and 38 of a pair of plates are in alignment, along with the inlets 20 and outlets 22 of the respective plates. By this arrangement, the corrugation patterns of the facing pairs of plates in each construction pair 60, while serving to direct and confine primary transverse heat-transfer fluid passages 16 between the plates of said stack construction pairs 60 extending transversely through said stack, also provide the aforesaid transverse relationship of corrugation patterns 38 on such facing plates, the transverse corrugations inciting desired turbulence in the primary flow channel. The facing formed patterns 38 of adjacent pairs of plates in the stacked construction pairs 60 serve also to direct and confine secondary heat-transfer passages 18 formed between said pairs 60 which are secured together by sealing adjacent edges 50, 52. The inlet 20 and outlet 22 openings to said secondary flow heat-transfer passages 18 are afforded between alternate plates in said stack by the aligned inlet 18 and outlet 22 openings extending longitudinally of the stack 12. The transverse corrugation patterns 38 on the opposite faces of the plates affords secondary flow passages 18 between said inlet 20 and outlet 22 openings to the longitudinal passages formed by the aligned openings 20 and 22, and with each facing pair of adjacent plates and adjacent pairs providing corrugations 36 transverse to corrugations 38 for inciting desired turbulence in said secondary flow heat-transfer passages 18.

It is noted that the stacked plates, formed and positioned together as above described, may be satisfactorily welded at the contact surfaces around the inlet 20 and outlet 22 openings, and around the circumferential contacting surfaces 50, 52 by means of electrical-resistance welding (or any other suitable securing means).

FIG. 4 illustrates the interengagement of the aligned embossments 40 in the contiguous plates of the stack 12. As shown, when a pair 60 of plates is formed by securing of the circumferential contacting surfaces 50 and 52 of plates 10a and 10b, the respective embossment 42a, 44b of plates 10a, 10b, respectively, are interengaged, as are the respective debossments 44a, 42b. For the next respective pair 60 of plates formed by interconnection of plates 10c and 10d, the respective embossments 42c, 44d and debossments 42c, 42d are interengaged, while a space 70 is defined between the pairs of plates 60, 60. Accordingly, the alignment embossments 40 of the contiguous plates forming a pair 60 of plates are effective to insure proper alignment between the said pair, while proper alignment between adjacent pairs of plates is assured by virtue of the interconnection of the formations about the periphery of the respective inlet 20 and outlet 22 openings which are secured together, as more fully described hereinabove.

In the assembled condition of the stack 12 according to the subject invention, the primary flow is through the stack 12 from the inner annular edge surface to the outer circumferential edge surface of the stack and thereafter requires no inlet and outlet connections contacting the plates of the stack. The provision of the plates of identical configuration and size, when stacked together, have corrugations substantially transverse to each other on the respective facing surfaces of plates forming the alternate primary flow and secondary flow channels, thereby assuring both a heat transfer through a single thickness of plate with inlet and outlet to both primary and secondary flow channels accomplished by formations in the plates, while affording also in each of the flow channels a transverse relationship of facing corrugations inciting turbulence flow in both the heat transfer regions and channels, thereby increasing the efficiency of heat transfer by retarding and distributing the flow in the channel.

Reference is made to the above mentioned U.S. Pat. No. 3,424,240, the disclosure of which is incorporated herein, for an exmaple of the possible use of the plate stack 12 of the subject invention as employed as the regenerator for a gas turbine engine. In addition, reference is made to said U.S. Pat. No. 3,424,204 for a disclosure of an assembly for supporting the stacked plate assembly 12 within an outer container for employment as a regenerator in a gas turbine engine.

Accordingly, there is disclosed a new and improved corrugated stacked-plate heat exchanger which is formed from a plurality of plates, each of which is of identical configuration and size, with the plates being alternatively rotated 180° about a diametrical axis, and with the plates being secured to from pairs of plates which, in turn, are interconnected. The utilization of plates having identical configuration for formation of a stacked-plate heat exchanger overcomes the shortcomings of the prior art, and more particularly, obviates problems associated with uneven production amounts and cost of manufacture. Tooling for manufacturing the subject plates is reduced in that only a single plate core and a single hydroform punch are required, thereby insuring a minimum of die upkeep, continuous flow production since no die changes are required, and minimum production halts due to die temperature and dimension changes. Still further, the new and improved plate of the subject invention includes alignment embossments thereby insuring the proper alignment of the pairs of plates during assembly and welding operations.

While the subject invention has been described with reference to a preferred embodiment, it will be apparent to one skilled in the art that various changes, alterations and modifications may be made thereto without departing from the scope and spirit of the subject invention as defined by the appended claims.

What is claimed is:

1. A heat exchanger device formed of a plurality of plates made of relatively thin metallic material, each of said plates being annular and including a central aperture, said plates being stacked so as to provide heat transfer through said plates to and from a series of alternating primary and secondary fluid flow passages formed between alternate stacked plates, said plates being of identical configuration and size, with pairs of said plates being stacked in back-to-back relationship such that one plate is rotated 180° about a diametrical axis relative to other plate, said pairs of plates being secured together to form a construction pair for formation of said stack, said pairs of plates having spaced openings therein aligned when stacked to form inlet and outlet to and from one of said series of flow passages in a direction longitudinal of said stacked plates, each said plate formed with an alternating arrangement about the circumference thereof of patterns of (1) radial corrugations extending between said spaced openings intermediate the radially inner and outer edges of the plate to define complementing channel-forming, generally parallel wave formations on both surfaces of said plate; and (2) waffle-shaped patterns extending between said spaced openings and providing complementing channel-forming, generally parallel wave formations extending both radially and circumferentially of said plate on both surfaces of said plate, with each said plate further including an array of alignment embossments radially disposed adjacent the inner radial edge thereof.

2. A heat exchanger device made up of a plurality of plates of substantially uniform extent and of relatively thin material as recited in claim 1 wherein each said alignment embossment includes an embossment portion and a debossment portion, said embossment and debossment portions being of identical configuration whereby the alignment embossments of a construction pair of said plates are interengaged.

3. A heat exchanger device made up of a plurality of plates of substantially uniform extent and of relatively thin material as recited in claim 1 wherein the openings in each plate are alternatively generally triangular and oblong in configuration.

* * * * *